United States Patent [19]
Dalziel

[11] 4,161,004
[45] Jul. 10, 1979

[54] HEAD POSITIONING MECHANISM FOR RECORDING/PLAYBACK MACHINE

[75] Inventor: Warren L. Dalziel, Monte Sereno, Calif.

[73] Assignee: Shugart Associates, Sunnyvale, Calif.

[21] Appl. No.: 784,905

[22] Filed: Apr. 5, 1977

[51] Int. Cl.² ............................................. G11B 5/56
[52] U.S. Cl. .................................... 360/106; 360/109; 74/89.2
[58] Field of Search .................. 360/106, 105, 97–99, 360/88; 192/149; 74/89.2; 308/6 R

[56] References Cited
U.S. PATENT DOCUMENTS

| | | | |
|---|---|---|---|
| 1,409,837 | 3/1922 | Eames | 192/149 |
| 1,730,014 | 10/1929 | Reece | 192/149 |
| 3,881,189 | 4/1975 | Mayeda | 360/106 |

*Primary Examiner*—John H. Wolff
*Attorney, Agent, or Firm*—Schatzel & Hamrick

[57] ABSTRACT

A positioning mechanism for a read/write head of recording/playback machine of the type utilizing discs upon which information is magnetically stored in concentric tracks includes a stationary guide member, a carriage which is connected to the guide member and which carries a read/write head for compliance to the surface of a disc upon which information is magnetically stored, a single capstan member which is driven to rotate incrementally from one angular position to another, and a flexible nonstretchable band which is wound at least once about the capstan and which has opposite ends extending from the capstan to connection to the carriage. During the period of rotation of the capstan, one end portion of the band is fed off the capstan while the opposite end portion is concommitantly wound onto the capstan; the tension exerted by the end portion which is wound onto the capstan draws the carriage member into motion relative to the guide member.

21 Claims, 8 Drawing Figures

FIG. 4

HEAD POSITIONING MECHANISM FOR RECORDING/PLAYBACK MACHINE

BACKGROUND OF THE INVENTION

1. Field of the Invention

The present invention relates generally to a magnetic recording/playback machine and, more particularly, to an improved positioning mechanism for a read/write head for such a machine.

2. Description of the Prior Art

In recording/playback machines which utilize discs for magnetically recording information, a positioning mechanism is employed to move a head radially across concentric recording tracks on the disc surface to magnetically read or write the stored information. In some prior art mechanisms, the positioning mechanism for the magnetic read/write head includes a lead screw upon which the read/write head rides and a stepping motor by means of which the lead screw is rotationally stepped in order to advance or retract the head radially across the face of the magnetic disc. Such a mechanism inclusive of a lead screw is shown, for example, in U.S. Pat. No. 3,814,441 to Craggs. Another type of head positioning mechanism is suggested in U.S. Pat. No. 3,946,439 to Owen et al. According to that latter patent, the positioning mechanism for a read/write head includes an endless belt trained around two spaced-apart pulleys; the endless belt carries the read/write head, and one of the pulleys is driven by a stepping motor to incrementally move the belt and, hence, to advance or retract the read/write head to a position at which access is gained to information stored on a magnetic disc.

The shortcomings of the aforementioned mechanisms and similar prior art devices relate to their speed, accuracy and cost. To appreciate such shortcomings, it should initially be understood that the information on the faces of magnetic discs is stored in concentric circular tracks which are spaced apart from one another by only, say, twenty thousandths of an inch or so. Further, it should be understood that in operation a read/write head must move accurately from one track of information to another in periods of time measured in milliseconds. For such fast positioning to be realized in an accurate manner, the mass of the positioning mechanism must be quite small or else its inertia, as in the Owen et al. device, will interfere with positional accuracy. With regard to inertia, it may be realized that the greater the number of moving parts, such as pulleys or the like, which either actuate or are involved in the motion of the positioning mechanism, the greater will be the momentum of the mechanism and, hence, the more difficult to obtain quick, accurate and dependable positioning over many cycles of usage.

SUMMARY OF THE INVENTION

A primary object of the present invention is to provide a quick-acting and accurate positioning mechanism for read/write heads in a recording/playback machine of the type which utilizes magnetic discs for information storage.

A further object of the present invention is to provide a positioning mechanism for the aforementioned purposes which has a minimum of moving parts.

According to the basic kinematics of the present invention, there is provided a guide member, a carriage which is connected to the guide member and which carries a read/write head for compliance to the surface of a disc upon which information is magnetically stored, a single capstan member which is driven to rotate incrementally from one angular position to another, and a flexible nonstretchable band means which is wound at least once about the capstan and which has opposite ends extending from the capstan to connection to the carriage. During the period of rotation of the capstan, one end portion of the band means is fed off the capstan while the opposite end portion is concomitantly wound onto the capstan; the tension exerted by the end portion which is wound onto the capstan draws the carriage member into motion relative to the guide member.

The foregoing and other objects of the present invention as well as advantages thereof may be readily ascertained by reference to the following description and appended illustrations, which are offered by way of example only and not in limitation of the invention, the scope of which is defined by the appended claims and equivalents to the materials, functions and structures recited therein.

IN THE DRAWING

FIG. 1 is a schematic view of a mechanism which operates according to the basic kinematics of the present invention;

DETAILED DESCRIPTION OF THE PREFERRED EMBODIMENT

Referring first to FIG. 1, the mechanism shown therein is offered to show some of the basic kinematics of mechanisms which will be described in detail hereinafter as particular embodiments of devices according to the present invention. The mechanism in FIG. 1 generally includes a stationary guide rod 1, a carriage member 2 mounted for sliding motion on the guide rod 1, a cylindrical member 4, called a capstan, which is rotatable about a stationary axis and which serves as the drive means for the mechanism, and a flexible, nonstretchable band means 6 which connects the capstan member 4 to the carriage member 2. The band means 6 serves the function of transmitting rotational motion of the capstan 4 to translational motion of the carriage member 2 upon the guide rod 1. A particular embodiment of the band means will be described later herein. For present purposes it should be noted that the band means 6 is wound at least once around the capstan 4 and that the band means has opposite end portions which extend from the capstan and are attached to spaced apart locations 7 and 8 on the carriage member 2.

The operation of the mechanism of FIG. 1 is as follows. As the capstan 4 is rotated, say clockwise in FIG.

7, the right end portion of the band means 6 is fed off the capstan member 4 while, simultaneously, the left end of the band means 6 is fed onto the capstan member. The carriage member 2 is followingly drawn to slide to the right on the guide rod 1 by the tension of the left end portion of the band means 6 as it is wound onto the capstan member 4. Thus, the rotational motion of the capstan member is transmitted to translation motion of the carriage member.

At this juncture, it should be noted that the translational motion of the carriage member is reciprocative back-and-forth in front of the capstan; the extremes of the reciprocative motion of the carriage member are shown by the dashed lines in FIG. 1. Even more particularly, it should be observed that the left hand point of attachment 7 of the band means 6 to the carriage member 2 will always lie to the left of the center line of the axis of rotation of the capstan 4 and, likewise, the right hand point of attachment 8 of the band means 6 to the carriage member 2 will always lie to the right of the centerline of the axis of rotation of the capstan. Still more particularly, it should be observed that the ends of the band means 6 extend approximately on a common tangent line with respect to the cylindrical sidewall of the capstan member 4; to accommodate that tangential relationship without the capstan member 4 abutting the carriage member 2, an elongated slot 10 is formed in the side of the carriage member.

Figures 2, 4:
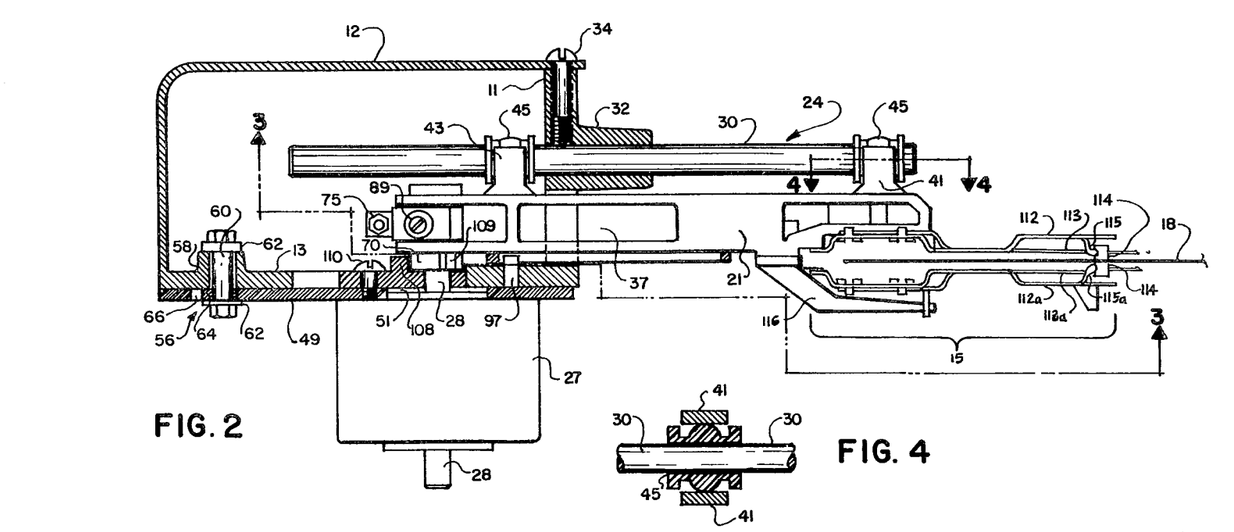
FIG. 2 is a side view, partially shown in section for purposes of illustration, of a read/write head positioning mechanism according to the present invention.
FIG. 4 is a sectional view of a detail of the mechanism of FIG. 2 and is taken along the lines 4—4 in FIG. 2.
Figure 3:
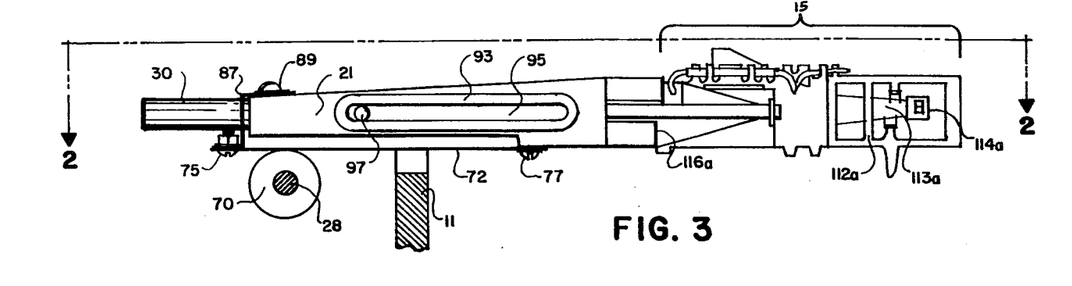
FIG. 3 is a sectional view taken along the lines 3—3 in FIG. 2 for viewing the direction of the arrows.

Referring now to FIGS. 2 and 3 of the drawings, the assembly shown therein is a positioning mechanism especially suited to carry read/write heads for a recording/playback machine which utilizes flexible or floppy discs. On such discs, information is magnetically stored in concentric tracks formed on the disc surface or face. Typically, the concentric tracks are about 20/1000 of an inch apart. The function of the head positioning mechanism is to accurately move the head incrementally from one track of information to another in minimal periods of time. In fact, the head positioning mechanism described hereinafter with regard to FIGS. 2 and 3 can accurately step from one information track to another in about three milliseconds.

The head positioning mechanism in FIGS. 2 and 3 should be understood to include a chassis 11 inclusive of a base plate 13 and a cover 12. The chassis is mountable to the frame, not shown, of the recording/playback machine proper. The positioning mechanism carries a read/write head assembly, generally designated by the bracket 15, having heads which are in compliance with recording surfaces on opposite faces of a rotatable magnetic disc 18. The positioning mechanism serves to move the read/write head assembly 15 back and forth radially across the faces of the magnetic disc (i.e., to the left and right in FIG. 2).

In the preferred embodiment, the head advancement mechanism generally comprises (a) a rigid positioning carriage 21 to which the read/write head assembly indicated by the brackets 15 is affixed, (b) guide means 24 fixedly connected to the chassis to guide the carriage 21 along a linear path of travel, (c) a rotary drive motor 27 which is fixedly connected to the aforementioned chassis 11 and which has a rotatable armature shaft 28, and (d) motion translation mechanism connected between the rotary drive motion 27 and the positioning carriage 21 to translate the torque and rotational motion of the drive motor 27 to linear force which moves the carriage 21 along its guided path of travel. In the following, each of the aforementioned components of the head positioning mechanism of FIGS. 2 and 3 will be described in detail.

Speaking first of the guide means 24, it comprises a smooth linear guide shaft 30, which is positioned stationarily on the chassis 11 to extend in a direction normal to the axis of the armature shaft 28 of the rotary drive motor 27. The guide shaft 30 can be made from stainless steel or annodized aluminum, for example, and is preferably circular in cross section. The illustrated structure which positions the guide shaft 30 is a tubular collar 32 which is cast integral to the chassis 11. In practice, the guide shaft 30 is inserted in the collar 32 and is adjustably located therein by means of at least one set screw 34 or the like.

Speaking next of the rigid positioning carriage 21, it comprises an elongated structural member which is illustrated as a molded piece having several coring voids 37 formed therein to reduce the mass of the carriage without affecting its stiffness. In practice, the positioning carriage 21 is typically formed of fiberglass-filled plastic or a similar lightweight material having the requisite rigidity. For purposes of convenience, in the following discussion, the end of the positioning carriage 21 which carries the read/write head assembly 15 will be referred to as the working end of the carriage while the opposite end of the carriage, which is worked by the rotary drive motor 27, will be referred to as the worked end.

Fixed at spaced-apart locations on the carriage 21, preferably adjacent the respective working and worked ends thereof, are a pair of ear members 41 and 43 which cooperate in slideably attaching the carriage 21 to the guide shaft 30 as shown in FIG. 4, so that the carriage 21 is free to travel along the straight path defined by the linear guide shaft 30. The illustrated ear members are U-shaped in cross section. Clamped within each of the U-shaped ear members 41 and 43 is a bobbin-like bushing 45 having a curvilinear exterior configuration and a cylindrical bore. The bushings 45 are preferably made of Teflon-filled plastic or a similar self-lubricating material, and their internal bores are dimensioned to slideably ride upon the guide shaft 30. The curvilinear external configuration of the bushings 45 allows them to pivot to follow the guide shaft 30 while remaining clamped within the U-shaped ears. Because of that ability to pivot, the bushing may be referred to as self-aligning.

The rotary drive motor 27 can be understood to comprise a conventional pulsed direct current motor of the step-type. Persons of skill in this art will recognize that a step-type motor is one wherein the rotational position of the motor's armature can be selectively controlled. More particularly, the angular position of the armature in such a motor can be selectively incremented by uniform degrees. For example, a 100 step motor is one whose armature turns in 3.6° increments and, hence, one full rotation (360°) of the armature comprises 100 individual steps. In practice, such motors have the shortcoming that they cannot quickly move loads having substantial inertia. Furthermore, even without loads, the armatures of said motors tend to overshoot the incremental angular steps and then oscillate angularly back and forth before settling at the step points. The components of the illustrated mechanism which are provided to overcome the oscillation problem are described in detail later herein. In the embodiment illustrated in FIG. 2, step-type drive motor 27 is fixed to an integral mounting plate 49 which, in turn, is adjustably mounted flat against the base plate 13 of the chassis 11. More particularly, the motor 27 is positioned so that its armature shaft 28 projects upwardly through an opening 51 formed in the mounting plate 49.

Preferably, the drive motor 27 is mounted to the chassis 11 in a manner which permits adjustment of the position of the motor, the carriage 21 and the head assembly 15. As shown in FIG. 2, a means for adjustably determining the position of the motor assembly includes an eccentric means, generally designated 56, mounted to extend through a collar 58 formed integral with the base plate 13 of the chassis 11. The illustrated eccentric means 56 is conventional and, as such, includes a bolt 60, a pair of washers or spacers 62, and a cam piece 64 fixed to the bolt 60 to rotate therewith to work against the edges of an aperture 66 formed in the mounting plate 49 to adjust the position of the read/write head assembly 15.

Figure 5:
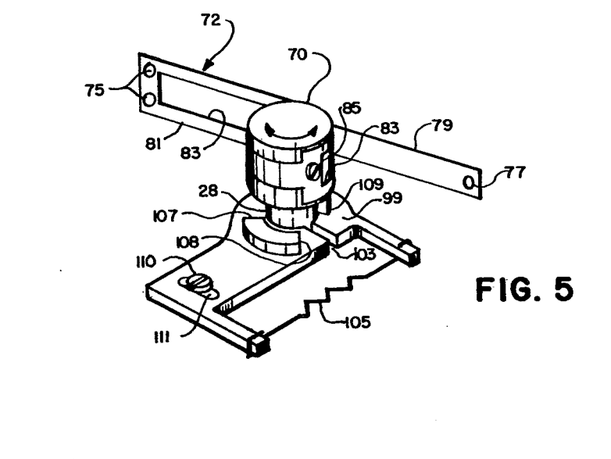
FIG. 5 is a pictorial view of a component of the mechanism of FIG. 2 drawn to an enlarged scale for purposes of clarity.

The aforementioned motion translation mechanism is connected to the distal end of the armature shaft 28 of the motor 27. As best shown in FIGS. 2 and 5, the motion translation mechanism includes a cylindrical capstan 70 which is fixed to the armature shaft 28 for rotation therewith. In order to appreciate the site of the motion translation mechanism, it may be appreciated that in practice, the capstan 70 is typically about 5/16 inch in radius. The motion translation mechanism further includes a flexible nonstretchable band 72 which is wound about the capstan 70. The preferred embodiment of the band 72 will be described in detail hereinafter; suffice it now to point out that the band has two opposite end portions which extend from the capstan generally on a common tangent line. The opposite ends of the band 72 are fixed to spaced apart points 75 and 77, respectively, on the positioning carriage 21. As shown best in FIG. 3, the attachment point 75 is at the worked end of the carriage 21 to the left of the axial centerline of the armature shaft 28, and the attachment point 77 is intermediate the length of the carriage to the right of the centerline of the armature shaft. (At this juncture, it may be noted that the points 75 and 77 at which the band 72 is attached to the carriage 21 should be located so that, during the desired travel of the positioning arm, the attachment point 75 at the worked end of the arm always remains to the left of the centerline or axis of the cylindrical capstan 70 while the attachment point 77 always remains to the right of the centerline of the capstan.)

Figure 6:
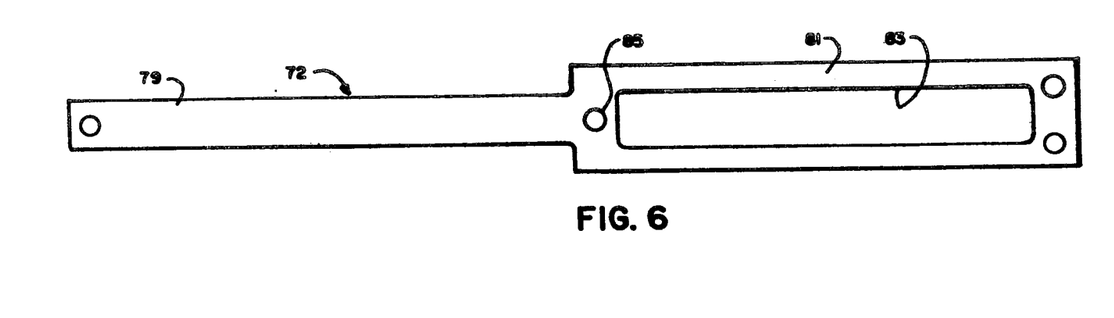
FIG. 6 is a side view of another component of the mechanism of FIG. 2.

The preferred embodiment of a flexible band 72 for use with the aforementioned capstan is shown in detail in FIG. 6. The band, 72, shown lying flat in the illustration, can be understood to have a thickness of about one to three mils. Typically, the band is made of stainless steel but other materials can be used so long as the materials have a high tensile strength and are flexible but do not stretch or creep appreciably when subjected to tension. In practice, the band 72 is subjected to tensions on the order of about three pounds force, average. The left-hand portion 79 of the illustrated band 72 is a long, relatively narrow strip. The right-hand portion 81 of the band 72 is a strip of about the same length as the left-hand portion but is considerably greater width. Formed medially and lengthwise through the right-hand portion 81 of the band 72 is an enlongated slot 83 which is just slightly wider than the narrow right-hand strip 79. The point designated 85 midway between the ends of the band 72 is the point at which the band is fixed to the capstan 70 (see FIG. 5).

When the band 72 is affixed to the capstan 70, as shown in FIG. 5, the wide portion 81 of the band is wound about a half turn counterclockwise around the capstan, and the narrow portion 79 of the band is wound about a half turn clockwise around the capstan 70 and extends through the slot 83 formed in the wide portion 81 of the band. As a result and as shown in FIG. 5, the narrow end 79 of the band extends to the right of the centerline of the capstan 70 and the wide end 81 of the band extends to the left of the centerline of the capstans.

Referring now to FIGS. 2 and 3, at least one end of the band 72 is preferably connected to the positioning carriage 21 by a resilient means. In the illustrated embodiment, the resilient means comprises a stiff flat spring 87 bent to have a backward Z-like configuration. One end of the flat spring 87 is fixed to the worked end of the carriage 21 as indicated by a screw 89 while the other end of the flat spring 87 is spaced free of the carriage and fixed to the end of the band 79 as indicated by the screw at point 75. The purpose of the flat spring 87 is to maintain tension in the band 72 and, also, to partially absorb impacts or jerks as the carriage 21 is driven to move by rotation of the armature 28 of the motor 27.

Referring still to FIGS. 2 and 3, the preferred embodiment of the head positioning mechanism further includes an auxiliary guide means for the carriage 21. In the illustrated embodiment, the auxiliary guide means includes a track member 93 integral with or fixedly attached to the carriage 21, which track member has an elongated guide slot 95 formed therein. Fixed to the base plate 13 of the chassis 11 is a pin member 97 located so that its protruding end slides within the guide slot 95. The diameter of the pin member 97 is, preferably, only slightly less than the width of the slot 95. It should be appreciated that the auxiliary guide means adds to the rigidity of the positioning mechanism and restricts rotation of the carriage 21 about the guide shaft 30.

Referring now to FIG. 5, the capstan 70 illustrated therein further preferably includes a damping/stop mechanism which damps oscillation of the armature shaft 28 following actuation of the step motor 27. The armature oscillation problem was mentioned earlier herein. The illustrated damping/stop mechanism includes a collar plate 99 which is mounted stationarily to the motor mounting plate 49 (FIG. 2). The collar plate 99 is partially split as indicated by numeral 103 ahd has an aperture formed therein to fit snugly about the armature shaft 28. Further, the damping/stop mechanism in FIG. 5 includes a biasing means, illustrated as a tension spring 105, connected across the split 103 in the collar plate 99 to draw the split portions toward one another and, thereby, to cause frictional engagement between the edges of the aperture and the armature shaft 28. This frictional engagement serves to damp the aforementioned angular oscillation of the armature shaft 28 when the step motor 27 steps from one angular position to another. Because of such damping, the positioning arm 21 "settles" more rapidly to a particular track position on a magnetic disc after an incremental step of the armature shaft.

The damping/stop mechanism in FIG. 5 also preferably includes a raised lug having end edges 107 and 108 which serve as "crash stops" against which strikes a protruding pin 109 or the like fixed to the capstan 70. The two lugs 107 and the pin 109 serve to limit rotation of the capstan to less than 360°, typically, to about 300°.

Still further, the damping/stop mechanism in FIG. 5 preferably includes an adjustment means for adjustment of the position of the collar member 99 on the motor mounting plate 49. In the illustrated embodiment, the adjustment means comprises an adjustment screw 110 which is mounted to extend through an arcuate slot 111 forced through the collar plate 99. As shown in FIG. 2, the screw 110 adjustably secures the collar plate 99 to the motor mounting plate 49.

Referring now to FIGS. 2 and 3, the read/write head assembly 15 which is carried by the carriage 21 will now be described quite generally. It should be understood that various types of read/write assemblies are well known to workers in this art and that the illustrated head assembly is offered by way of example only. The upper portion of the read/write head assembly 15 includes a stiff structural member 112 which serves to locate the head. The upper portion of the assembly further includes a flexure piece 113 which is fixed to and protected by the member 112. Still further, the upper portion of the assembly 15 includes a magnetic transducer device 114 which is carried by the distal end of the flexure piece 113. It is that transducer device 114 which actually rides upon the upper face of the disc 18 and serves to convert magnetic flux changes to electrical signals and visa versa. The transducer device 114 is electrically coupled to the record/playback machine by wires 115.

The components of the lower portion of read/write head assembly 15 in FIGS. 2 and 3 are generally the same as the components of the upper portion and, for that reason, are identified by the same numerals accompanied by the subscript "a." In the particular illustrated assembly, it should be understood that the structural member 112a is selectively pivotable downward onto stop member 116. This pivotable action is provided to free the read/write heads from the magnetic disc 118.

The operation of the mechanism described hereinbefore with respect to FIGS. 2-6 can now be readily understood. When the rotary step motor 27 is driven to incrementally rotate the armature shaft 28 from one angular position to another, say 3° or so clockwise with respect to FIG. 5, the narrow end portion 79 of the band 72 feeds off the capstan 70 while the opposite (wide) end portion 81 of the band simultaneously is wound onto the capstan. The latter end portion 81 of the band is in tension, since it is connected to point 75 on the carriage 21, and can be understood to draw the carriage 21 to the left in FIGS. 2 and 3 along the straight path of travel defined by the linear guide shaft 30. It should be noted that, as the capstan 70 rotates, the narrow end 79 of the band slides within the slot 83 formed within the wide end portion 81 of the band and, hence, the effective length of the band 72 does not change as it is wound onto or off the capstan 70. In other words, the end portions of the band 72 do not overlie one another when either end portion is wound upon the capstan 70 so long as the angular displacement of the capstan is less than one full rotation, 360°.

After motion of the capstan 70 has been actuated by the step motor 27 and the incremental angular step point has been reached, oscillations of the capstan about the step point are effectively damped by frictional engagement between the armature shaft 28 and the split collar plate 99. After a number of angular steps the protruding pin 109 on the capstan 70 abuts against the crash stop surfaces 107 or 108 (depending upon the direction of rotation) and that, in turn, serves to define the extent of travel of the positioning carriage 21 to either the right or the left.

Although the band 72 has heretofore been described as a single strip, it may now be realized that the band could comprise two separate pieces or a cable which is affixed to and wound about the capstan. The aforedescribed band is, however, the preferred embodiment since it has the structural integrity to withstand literally millions of cycles of usage without stretching or otherwise wearing.

Figures 7, 8:
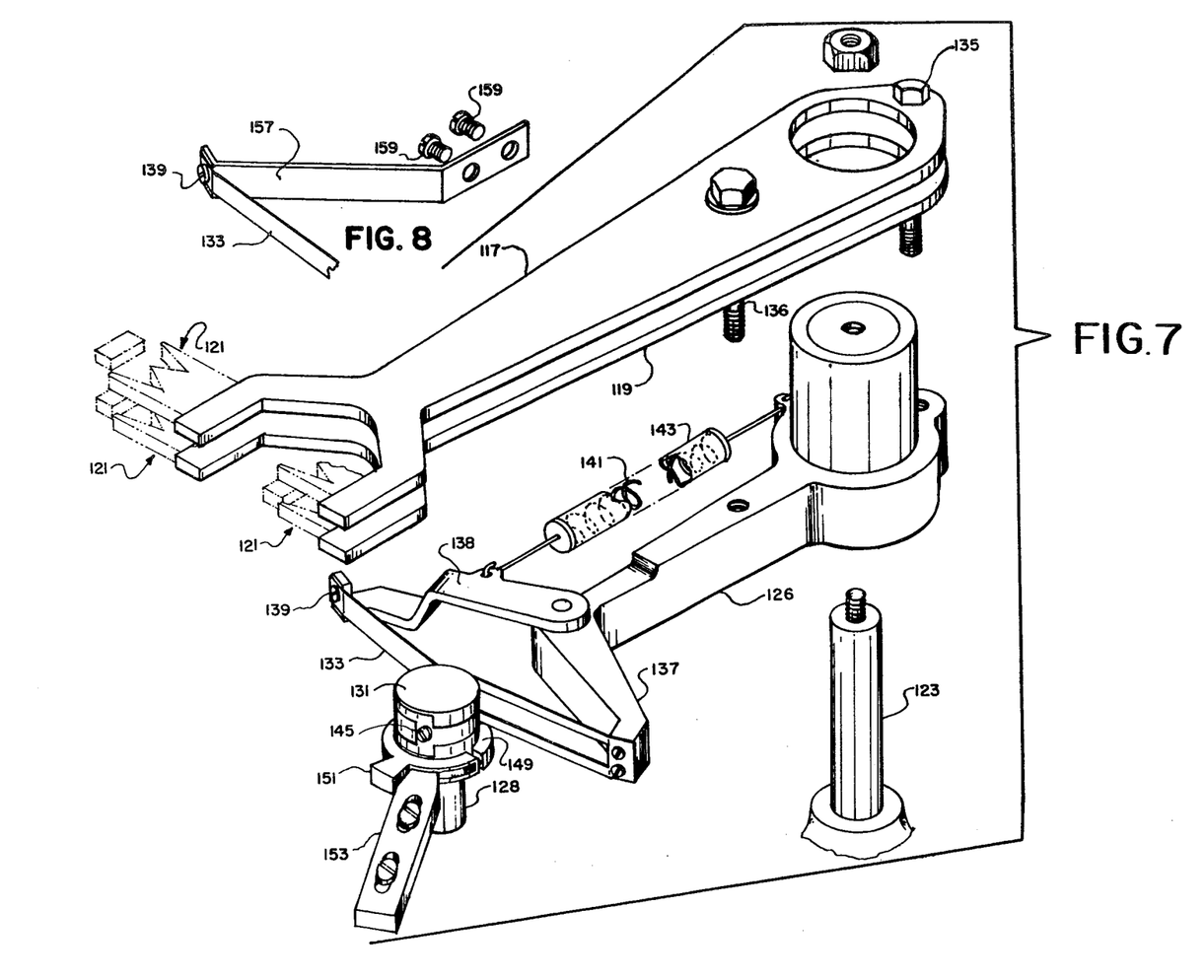
FIG. 7 is a pictorial view of a particular modification of the mechanism of FIG. 1.
FIG. 8 is a pictorial view illustrating a particular modification of a detail of the mechanism of FIG. 7.

In FIG. 7 there is shown an alternative embodiment of a positioning mechanism for read/write heads on a recording/playback machine. This embodiment of the positioning mechanism is particularly adapted for use with a recording/playback machine of the type which utilizes stacks of spaced-apart, rigid discs on which information is magnetically stored. The function of this head positioning mechanism, like the one previously described, is to accurately move read/write heads from one track of information to another on magnetic discs in minimal periods of time.

Generally speaking, the head positioning mechanism illustrated in FIG. 7 includes the following components: (a) two or more rigid positioning arms 117 and 119 which each carry one or more read/write heads, generally designated 121, (b) a guide shaft 123 about which the positioning arms 117 and 119 pivot in an arcuate path of tavel, (c) a driven arm, generally designated 126, which is rigidly connected to the aforementioned head positioning arms 117 and 119 to rotate therewith about the guide shaft 123 and which functions equivalently to the carriages in the aforedescribed embodiments, (d) a rotary drive motor, not shown, having a rotatable armature shaft 128 and (e) a motion translation mechanism inclusive of a capstan 131 fixed to the armature shaft 128 for rotation therewith and a flexible, nonextensible band 133 which is wound about the capstan 131 and connected to the driven arm 126 so as to transmit the rotational motion of the armature shaft 128 to the driven arm 126 and, thereby, to cause arcuate movement of the head positioning arms 117 and 119 about the guide shaft 123. Speaking now of the illustrated guide shaft 123, it is a smooth rod which is stationarily mounted to extend parallel to the armature shaft of the motor. The two positioning arms 117 and 119 as well as the driven arm 126 are suitably journaled to the shaft 123 for free rotation thereabout. Thus, it may be understood that the guide shaft 123 performs a function equivalent, for present purposes, to the functions of the guide means in the aforedescribed embodiments.

The two positioning arms 117 and 119 are rigidly coupled to one another and to the driven arm 126 by means, for example, of rigid link members 135 and 136 or the like. Thus, the assembly of those three arms corresponds functionally to the carriage member 2 which was described with respect to FIG. 1. In the illustrated embodiment, the positioning arms 117 and 119 have bifurcated ends to carry, on each line, an individual read/write head. One skilled in this art should readily recognize that the positioning arms could have other configurations and that the illustrated shape of the arms is merely a matter of design choice.

The illustrated driven arm 126 is bifurcated; the respective bifurcated portions are comprised of a rigid dog-leg shaped section 137 and a linkage piece 138 pivotally connected at the knee of the dog-leg section 137. Connected between the distal end of the linkage piece 138 and the journaled end of the dog-leg section is a spiral-wound tensioning spring 141. Preferably, the tensioning spring 141 is encased in a tubular sheath 143 which functions to prevent the spring from oscillating or swaying; for that purpose, the sheath 143 can be in direct contact with the turns of the spring 141. Alternatively, a flat or flexure type spring, such as that shown in FIG. 8, could be used to provide band tension.

The capstan 131 and the flexible band 133 which is wound thereabout should be understood to be similar to the ones described hereinbefore. The opposite ends of band 133 in this embodiment are connected, respectively, to the distal ends of the dog-leg section 137 and the linkage piece 138. The band is also connected to the capstan at point 145. Here again, the various components are preferably located so that the respective end portions of the flexible band 133 extend generally along a common tangent line with respect to the capstan 131. At this juncture, it may be appreciated that the spring 141 serves to maintain tension in the band 133.

The read/write heads which are illustrated schematically in FIG. 7 are, for example, the so-called "Winchester" type heads. The Winchester heads are well known to workers skilled in this art and are commercially available from Infomag Corporation of Goleta, Calif.

The mechanism in FIG. 7 also preferably includes a "crash stop" means. In the illustrated embodiment, which is offered by way of example only, the crash stop includes a split collar member 149 which is fixed about the armature shaft 128 for rotation therewith and which includes a protruding lug piece 151. This illustrated embodiment further includes a selectively positionable member 153 which is mountable on the chassis of the head positioning mechanism in a position to strike against the lug piece 151 of the collar 149 and, thus, to define and limit of angular travel of the capstan 131 to less than one full revolution in the clockwise and counterclockwise direction. Alternatively, a stop of the type shown in FIG. 5 could be used.

The operation of the mechanism in FIG. 7 can now be readily understood. Upon rotation of the capstan 131, one end portion of the band 133 is wound off the capstan while the opposite end portion of the band is wound onto the capstan. This action and travel of the band 133 forces the driven arm 126 to followingly rotate about the guide shaft 123. As a result, the head positioning arms 117 and 119 are also caused to rotate. Hence, one apparent distinction between this embodiment of the head positioning mechanism and the ones described earlier is that, here, the positioning arms move in an arcuate path rather than linearly.

FIG. 8 illustrates one modification of the aforementioned driven arm 126. More particularly, FIG. 8 shows a flexure arm 157 which can be utilized as an alternative to the previously described linkage piece 138 instead of being pivotably secured to the rigid section 137 of the driven arm 26, the flexure arm can be rigidly affixed by means of screws 159 or the like. As shown, the narrow end of the band 133 is attached to the distal end of the flexure arm 157 as indicated by screw 139. Functionally and physically, the flexure arm comprises a flat spring. One advantage of the flexure arm 138 in comparison to the pivotably-mounted linkage piece of 138 of FIG. 7, is that, with the former, it is not essential to provide an independent tensioning spring such as 141 or at least as heavy a spring.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. A positioning mechanism for a read/write head of a recording/playback machine of the type utilizing discs upon which information is magnetically stored, said positioning mechanism comprising:
   a rotary drive motor having an armature shaft;
   a capstan affixed to the armature shaft of said rotary drive motor for rotation therewith when the motor is actuated;
   a carriage means adapted to carry a magnetic read/write head;
   a guide means connected to said carriage means to define a path of movement therefor, said path being parallel to a line generally tangent to said capstan;
   a flexible, nonstretchable band means having opposite ends, said band means being wound about said capstan and fixed thereto with the opposite end portions of said band extending from said capstan substantially along said line tangent; and
   attachment means for attaching respective ends of said band means to spaced-apart locations on said carriage means, said attachment means including resilient means for attaching one end of said band to said carriage and for applying a biasing force thereto which tends to maintain a predetermined tension in said band whereby upon an incremental angular rotation of said armature shaft, one end portion of said band is wound off of said capstan and the opposite end portion of said band is simultaneously wound onto said capstan, thereby causing said carriage means to move along said path.

2. A positioning mechanism as recited in claim 1 wherein said flexible nonstretchable band has one end portion which is a long relatively narrow strip and an opposite end portion which is a long relatively wide strip having an elongated slot formed along the length thereof and which accepts said narrow strip when said band is wound about said capstan.

3. A positioning mechanism as recited in claim 1 wherein said guide means includes a smooth straight shaft fixed to define a linear path of travel for said carriage means.

4. A positioning mechanism as recited in claim 3 wherein said guide means further includes
   means slideably attaching said carriage means to said smooth straight shaft,
   at least two pairs of ear members respectfully affixed to said carriage at spaced apart locations thereon, and
   bushing members disposed between the ear members of each said pair and adapted to slideably engage said shaft.

5. A positioning mechanism as recited in claim 4 wherein said ear members are formed by the distal ends of generally U-shaped bodies and said bushing members are bobbin-like devices having curvilinear exterior configurations for mating with said U-shaped bodies, said bushing members having bores formed therethrough for slideably receiving said shaft.

6. A positioning mechanism as recited in claim 1 and further including a damping member connected to the body of said drive motor and in frictional engagement with said armature shaft to damp oscillations thereof.

7. A positioning mechanism as recited in claim 6, wherein said damping member includes a discontinuous annular portion disposed about said armature shaft and resilient means affixed thereto tending to draw the discontinuous ends of said annular portion toward each other so that the inner annular surface of said annular portion frictionally engages said armature shaft.

8. A positioning mechanism as recited in claim 1 wherein said rotary drive motor is a pulsed direct current motor of the stepping type.

9. A positioning mechanism as recited in claim 7 wherein said first member is flexible and forms said resilient means.

10. A positioning mechanism as recited in claim 1 and further including stop means affixed to the body of said drive motor to limit the angular displacement of said capstan to less than one full revolution in the clockwise and counterclockwise directions.

11. A positioning mechanism for a read/write head of a recording/playback machine of the type utilizing discs upon which information is magnetically stored in concentric tracks, said positioning mechanism comprising:
- a rotary drive motor of the step-type mounted to the machine chassis with the drive shaft of said motor extending therefrom;
- a rigid carriage having a working end adapted to carry a magnetic read/write head, and a worked end connected to said drive shaft;
- a linear guide means stationarily mounted to said chassis to define a straight path of travel for said carriage;
- a capstan fixed to the distal end of said drive shaft for rotation therewith when the motor is actuated;
- means slideably attaching said carriage to said linear guide means so that said carriage is free to travel along the straight path defined by said linear guide means, which path of travel is such that said carriage moves to-and-fro with respect to a line tangent to the working surface of said capstan;
- a flexible, nonstretchable band wound one revolution about said capstan, said band having end portions extending in opposite directions with respect to a line tangent to said capstan;
- attachment means for attaching the respective extending ends of said band to spaced apart locations on said carriage said attachment means including resilient means for attaching one end of said band to said carriage and for applying a biasing force thereto which tends to maintain a predetermined tension in said band, whereby upon an incremental angular step of said armature shaft, one end portion of said band feeds off said capstan and the opposite end portion of said band simultaneously feeds into said capstan thereby drawing said rigid carriage along said linear guide means.

12. A positioning mechanism for read/write head of a recording/playback machine of the type utilizing discs upon which information is magnetically stored, said positioning mechanism comprising:
- a machine chassis:
- a rotary drive motor supported by said chassis and having a drive shaft;
- a capstan affixed to said drive shaft for rotation therewith;
- a carriage means adapted to carry at least one magnetic read/write head;
- guide means for pivotally attaching said carriage means to said chassis to define an arcuate path of movement for said read/write head;
- a flexible nonstretchable band means affixed to said capstan and would thereabout with the opposite end portions of said band extending from said capstan generally along a line tangent to said arcuate path; and
- attachment means for attaching the respective ends of said band means to spaced-apart locations on said carriage means, said attachment means including resilient means for attaching one end of said band to said carriage and for applying a biasing force thereto which tends to maintain a predetermined tension in said band, whereby upon an incremental angular rotation of said armature shaft, one end portion of said band is wound off of said capstan and the opposite end portion of said band is simultaneously wound onto said capstan so as to cause said carriage means to move along said path.

13. A positioning mechanism as recited in claim 12 and further comprising a dampening member connected to the body of said drive motor and in frictional engagement with said armature shaft to damp oscillations thereof.

14. A positioning mechanism as recited in claim 13 wherein said damping member includes a discontinuous annular portion disposed about said armature shaft and resilient means affixed thereto tending to draw the discontinuous ends of said annular portion toward each other so that the inner annular surface of said annular portion frictionally engages said armature shaft.

15. A positioning mechanism as recited in claim 12 wherein said carriage means includes an arm having an elongated portion and a bifurcated distal portion forming first and second members to which the opposite ends of said band means are respectively connected.

16. A positioning mechanism as recited in claim 15 wherein said first member is pivotally connected to said elongated portion and resilient means are provided for biasing said first member away from said second member so as to apply a tensile force to said band means.

17. A positioning mechanism as recited in claim 12 and further including stop means affixed to the body of said drive motor to limit the angular displacement of said capstan to less than one full revolution in the clockwise and counterclockwise directions.

18. A positioning mechanism as recited in claim 12 wherein said guide means includes a guide shaft which supports said carriage means and defines an axis of rotation about which said carriage means is rotated as said motor is actuated.

19. A positioning mechanism as recited in claim 18 wherein said carriage means includes an arm that extends radially with respect to said guide shaft and serves to carry said read/write heads at its distal end.

20. A positioning mechanism as recited in claim 18 wherein said carriage means includes an arm having an elongated portion and a bifurcated distal portion forming first and second members to which the opposite ends of said band means are respectively connected.

21. A positioning mechanism as recited in claim 20 wherein said first member is pivotally connected to said elongated portion and resilient means are provided for biasing said first member away from said second member so as to apply a tensile force to said band means.

* * * * *

REEXAMINATION CERTIFICATE (445th)
United States Patent [19]
Dalziel

[11] B1 4,161,004
[45] Certificate Issued  Jan. 21, 1986

[54] HEAD POSITIONING MECHANISM FOR RECORDING/PLAYBACK MACHINE

[75] Inventor: Warren L. Dalziel, Monte Sereno, Calif.

[73] Assignee: Shugart Associates, Sunnyvale, Calif.

Reexamination Request:
No. 90/000,530, Mar. 19, 1984

Reexamination Certificate for:
Patent No.: 4,161,004
Issued: Jul. 10, 1979
Appl. No.: 784,905
Filed: Apr. 5, 1977

[51] Int. Cl.$^4$ .............................................. G11B 5/56
[52] U.S. Cl. ................................. 360/106; 360/109; 74/89.2
[58] Field of Search ........................... 360/88, 104–106, 360/97–99, 109; 308/6 R; 74/89.2; 192/149

[56] References Cited
U.S. PATENT DOCUMENTS

| | | |
|---|---|---|
| 663,805 | 12/1900 | Crawford . |
| 2,559,733 | 7/1951 | Pitman et al. . |
| 2,690,082 | 9/1954 | Orcutt . |
| 3,167,962 | 2/1965 | Scotto . |
| 3,474,687 | 10/1969 | Zenzefilis .............................. 74/518 |
| 3,488,098 | 1/1970 | Sobczak ................................. 308/6 |
| 3,592,069 | 7/1971 | Welch ................................... 74/89.2 |
| 3,859,662 | 1/1975 | Habich et al. ......................... 360/106 |
| 3,881,189 | 4/1975 | Mayeda ................................ 360/106 |
| 3,955,430 | 5/1976 | Rhoads ................................. 74/89.2 |
| 4,060,149 | 11/1977 | Henley ................................. 182/133 |

FOREIGN PATENT DOCUMENTS

| | | |
|---|---|---|
| 609703 | 9/1960 | Italy . |
| 49-131410 | 12/1984 | Japan . |
| 620721 | 7/1978 | U.S.S.R. . |

OTHER PUBLICATIONS

Arrington, W. M., "Rotary Scan Mechanism", IBM Technical Disclosure Bulletin, vol. 14, No. 6, Nov. 1971, pp. 1802–1804.

*Primary Examiner*—John H. Wolff

[57] ABSTRACT

A positioning mechanism for a read/write head of recording/playback machine of the type utilizing discs upon which information is magnetically stored in concentric tracks includes a stationary guide member, a carriage which is connected to the guide member and which carries a read/write head for compliance to the surface of a disc upon which information is magnetically stored, a single capstan member which is driven to rotate incrementally from one angular position to another, and a flexible nonstretchable band which is wound at least once about the capstan and which has opposite ends extending from the capstan to connection to the carriage. During the period of rotation of the capstan, one end portion of the band is fed off the capstan while the opposite end portion is concommitantly wound onto the capstan; the tension exerted by the end portion which is wound onto the capstan draws the carriage member into motion relative to the guide member.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

The drawing figure(s) have been changed as follows: the phrase, "FIG. 1" has been added.

AS A RESULT OF REEXAMINATION: IT HAS BEEN DETERMINED THAT:

The patentability of claims 1–21 is confirmed.

New claim 22 is added and determined to be patentable.

*22. A positioning mechanism as recited in claim 1 wherein said resilient means substantially uniformly tensions said one end portion and said opposite end portion of said band.*

* * * * *